S. J. TODD.
PUNCTURE PROOF SHOE FOR PNEUMATIC TIRES.
APPLICATION FILED JAN. 10, 1921.
1,393,185.
Patented Oct. 11, 1921.
2 SHEETS—SHEET 1.
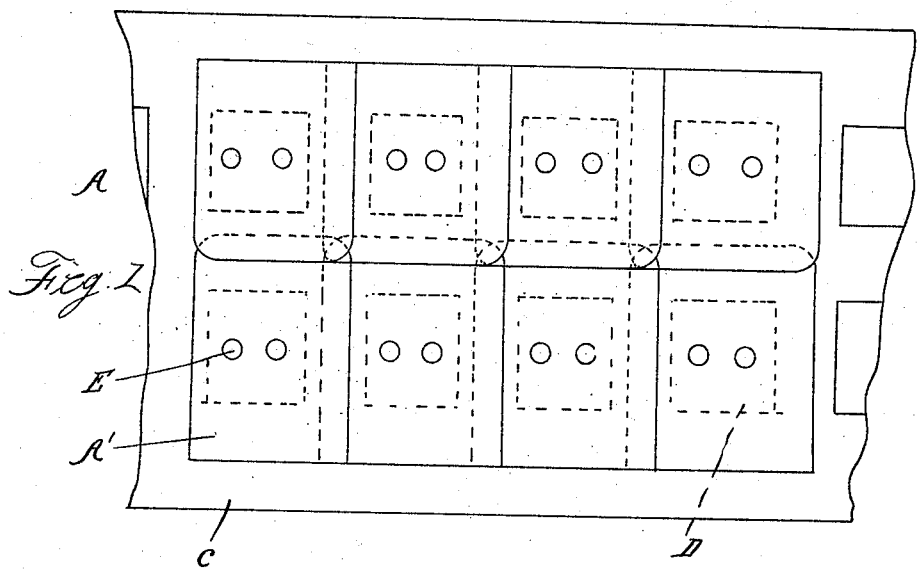
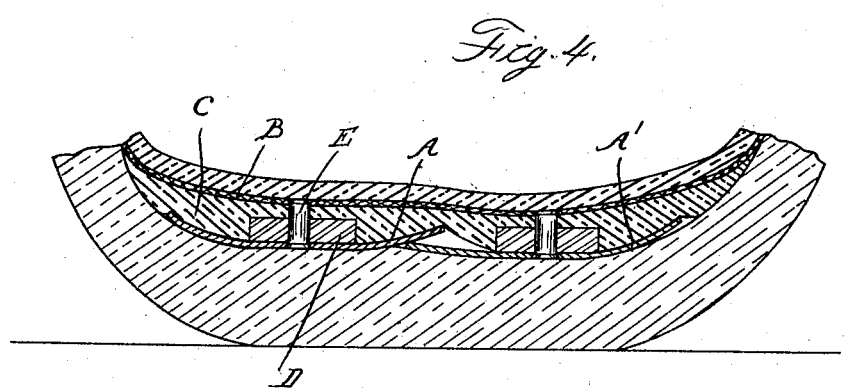
Inventor
Samuel J. Todd S. J. TODD.
PUNCTURE PROOF SHOE FOR PNEUMATIC TIRES.
APPLICATION FILED JAN. 10, 1921.
1,393,185.
Patented Oct. 11, 1921.
2 SHEETS—SHEET 2.
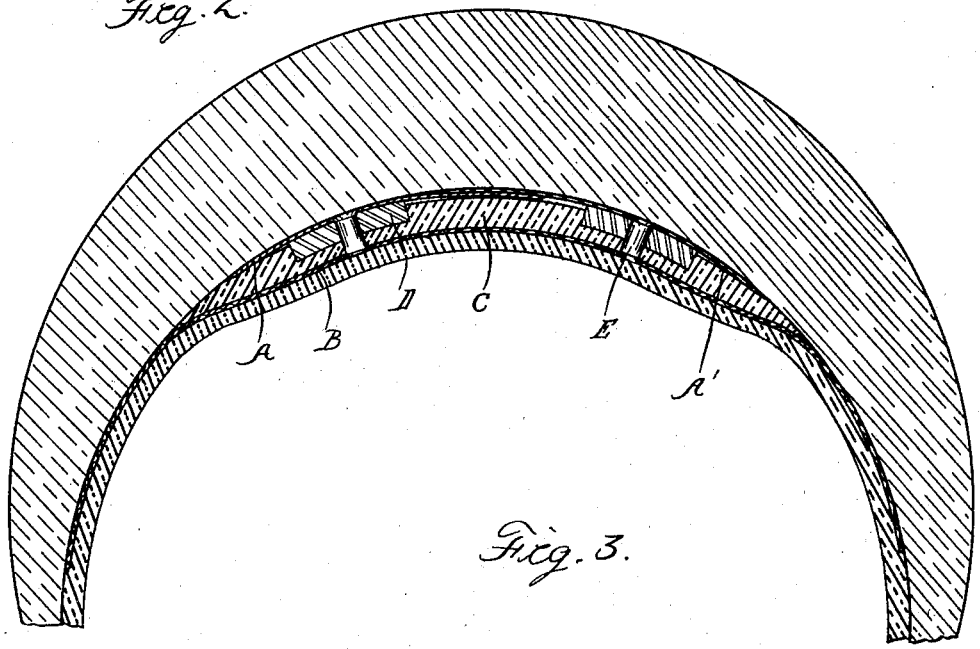
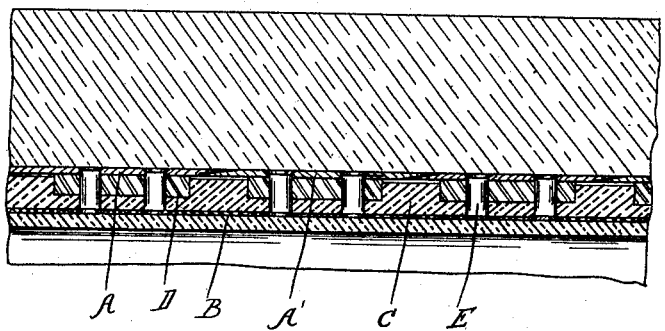
Inventor
Samuel J. Todd

UNITED STATES PATENT OFFICE.

SAMUEL J. TODD, OF DETROIT, MICHIGAN, ASSIGNOR OF ONE-FOURTH TO HILLIARD N. A. McLEAN AND ONE-FOURTH TO RALPH M. TATE, BOTH OF DETROIT, MICHIGAN.

PUNCTURE-PROOF SHOE FOR PNEUMATIC TIRES.

1,393,185. Specification of Letters Patent. Patented Oct. 11, 1921.

Application filed January 10, 1921. Serial No. 436,026.

*To all whom it may concern:*

Be it known that I, SAMUEL J. TODD, a citizen of the United States of America, residing at Detroit, in the county of Wayne and State of Michigan, have invented certain new and useful Improvements in Puncture-Proof Shoes for Pneumatic Tires, of which the following is a specification, reference being had therein to the accompanying drawings.

The invention relates to shoes designed for use in connection with pneumatic tires intermediate the outer case and inner tube, and it is the object of the invention to obtain a construction which will effectually prevent puncture. To this end the invention consists in a construction comprising a series of overlapping metallic plates, each being secured in a fixed location with respect to the shoe, but permitting relative movement of the overlapping portions thereof. The invention further consists in forming said plates of resilient material of sufficient hardness to deflect or turn any puncturing point passing through the outer case; further, in the means for cushioning the overlapping edges of the plates; and further, in various features of construction as hereinafter set forth.

In the drawings:

Figure 1 is a diagrammatic view showing a development of the shoe in a plane;

Fig. 2 is a cross-section through the shoe as arranged between the case and inner tube of a tire;

Fig. 3 is a longitudinal section thereof;

Fig. 4 is a view similar to Fig. 2, showing the tire and shoe as deformed under load.

In the present state of the art, protecting shoes for tires have been formed comprising a series of metallic plates embedded in the fabric and designed to prevent puncture. In use, however, such devices often fail for the reason that the puncturing points will pass between plates and thus gain access to the inner tube. With my invention the protecting plates are so secured and located with reference to each other that it is impossible for any puncturing point to pass therebetween.

As shown in Fig. 1, A, A', etc., are a series of metallic plates, preferably formed of spring steel and fashioned to conform to the general contour of the inner wall of the tire case when inflated and free from load. Each plate is therefore of segmental form and of such dimensions as to overlap adjoining plates. Preferably, there are two series of plates on opposite sides of the central plane of the tire and overlapping each other at the center. These plates extend for a sufficient distance to protect the tread portion of the tire and to obstruct the passage of anything which could reach the inner tube. The overlapping portions of the plates are thinned and tapered so that in normal position the thickness of the overlapping portions is not greatly in excess of that of the central portion of the plate.

To hold these plates in fixed location the shoe is provided with an inner fabric layer B, outside of which is a cushioning layer C of relatively soft rubber. Embedded in this cushioning layer are bearings D for the outer plates, these being preferably of metal and preferably of aluminum, for the sake of lightness. The bearings D are arranged centrally of each plate, but between these bearings are portions of the cushioning material which are adjacent to the overlapping portions of the plate. The plates are secured in position by rivets or other means such as E, these passing through the bearings D and fabric B. Thus each of the plates is in fixed location with reference to the fabric, but is free from all adjoining plates.

With the construction as described, the shoe may be readily inserted within a tire case adjacent to the inner wall thereof and with the inner tube bearing thereagainst. When the tire is inflated, the overlapping plates A, A', etc., will conform exactly to the shape thereof, but when under load, the tire is deformed, and these plates must move relative to each other. Thus as shown in Fig. 4, if the tire is flattened, the segmental plates would also be somewhat flattened, but the edge portions thereof will separate slightly from each other as well as relatively moving longitudinally. Such movement will not, however, produce any injurious effect on either the case or the inner tube, as the cushion C is sufficiently yielding to permit of such deflection. Thus, as shown in an exaggerated way in Fig. 4, the edge of the segmental plate A at the center of the tire is separated from the edge of the plate A', overlapping the same and the cushion is yielded to permit of this separation without, however, pinching the inner tube or doing anything to injure the same. In the same manner all of the other overlapping portions are free to move relatively and are so cushioned as to prevent injury to the tire.

It is obvious that any nail or other sharp point which penetrates the outer tread portion of the tire will be deflected by the protecting plates and cannot pass between the same on account of the overlapping portions. Thus puncturing of the tire is effectually prevented, while the resiliency and freedom of movement is not materially reduced.

What I claim as my invention is:

1. The combination with a pneumatic tire, of a protecting shoe therefor comprising a series of resilient metallic plates covering the tread portion of the tire and overlapping each other, a fabric member to which said plates are secured for holding each in a fixed location, a cushioning material between said fabric member and plates, and rigid members embedded in said cushioning material to which the plates are respectively secured.

2. The combination with a pneumatic tire, of a protecting shoe therefor comprising a series of metallic plates, together covering the inner face of the tread portion of the tire and having their marginal portions overlapping, said plates being fashioned to conform to the normal shape of said inner face and being formed of resilient material, a fabric lining to which each of said plates is centrally attached, a cushion of resilient material between said plates and said fabric lining, and rigid members embedded in said cushioning material at the center of the respective plates, diminishing the thickness of the cushion adjacent the same.

In testimony whereof I affix my signature.

SAMUEL J. TODD.